March 19, 1957 P. H. TAYLOR ET AL 2,785,887
TENSION LIQUID SPRING
Filed March 16, 1954 2 Sheets-Sheet 1

INVENTOR.
Paul H. Taylor and
Robert F. Zumwalt
By B. Schlesinger
Attorney

INVENTOR.
Paul H. Taylor and
Robert F. Zumwalt
By [signature]
Attorney.

United States Patent Office 2,785,887
Patented Mar. 19, 1957

2,785,887

TENSION LIQUID SPRING

Paul H. Taylor, Grand Island, and Robert F. Zumwalt, Tonawanda, N. Y., assignors to Wales-Strippit Corporation, North Tonawanda, N. Y., a corporation of New York Application March 16, 1954, Serial No. 416,472

4 Claims. (Cl. 267—1)

The present invention relates to liquid springs, and more particularly to a liquid spring which is adapted to operate as a tension spring between two relatively movable parts.

In the past, liquid springs have been of the so-called compression type, and have been constructed so that the relatively movable parts between which the springs are used, such as the bed and ram of a press, or the chassis and axle of an automotive vehicle, have been sprung by compression of the liquid in the springs. When liquid springs have been required for tensioning purposes, it has been customary to surround them with a tensioning cage or adapter constructed so that parallel and slidably opposed members place a compression on the spring as these members are tensioned.

Obviously, design of a cage suitable for a particular installation creates many problems. It adds a complexity to the spring unit. Moreover, it is often difficult to utilize a tensioning cage or adapter on many of the modern pieces of equipment where a tension spring is required.

While tension springs of the mechanical type are easily fabricated, because the resilient medium, a coil or a leaf spring, is readily subject to reversal so that it can be used either in compression or tension, it is obvious that in the case of a liquid the alternate to compression, namely, tension, merely reduces the pressure. In fact, the only pressure that could possibly be realized by the tensioning of the liquid would be that caused by atmospheric pressure opposing the movement of the movable part of the spring in the direction of tensioning.

The primary object of the present invention is to provide a tension type liquid spring which will require no cage or adapter for it to function.

Another object of this invention is to provide a tension type liquid spring in which the liquid of the spring is compressed when the spring is in tension.

Another object of the invention is to provide a tension type liquid spring which can be preloaded.

A further object of the invention is to provide a tension type liquid spring having means for positively limiting the tensioning movement of the spring.

Another object of the invention is to provide a self-contained liquid tension spring which is capable of adjustment of stroke.

A further object of the invention is to provide a liquid tension spring in which the travel of the spring may be limited by eliminating or restricting movement of the liquid itself in the spring.

Other objects of the invention will be apparent hereinafter from the specification and from the recital of the appended claims.

Figure 1:
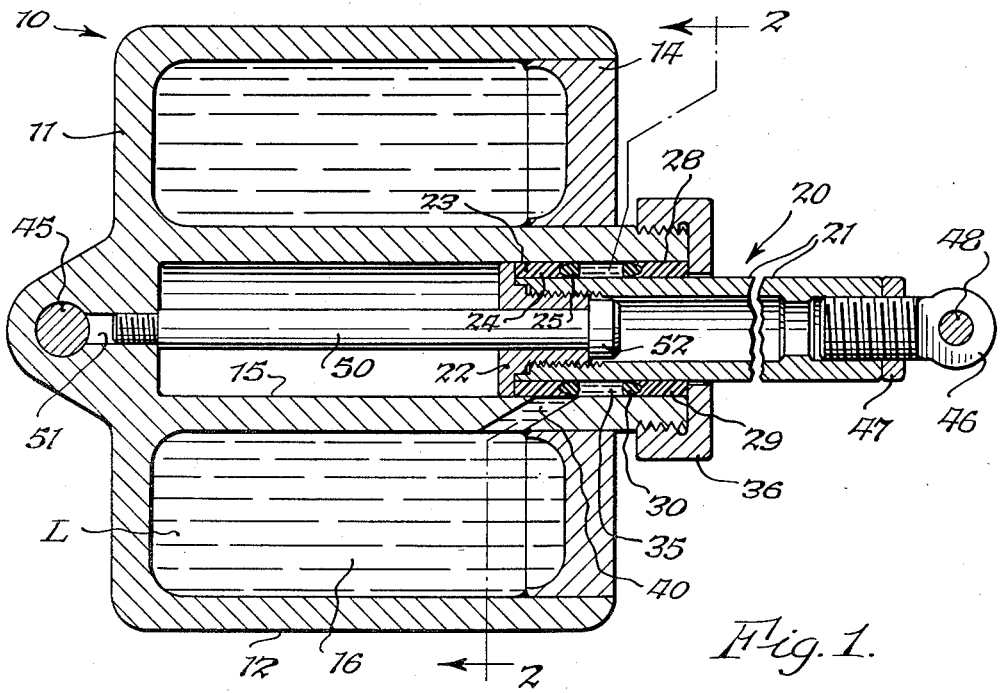
Fig. 1 is an axial section of a liquid tension spring constructed according to one embodiment of this invention, and showing the spring in extended position.
Figure 2:
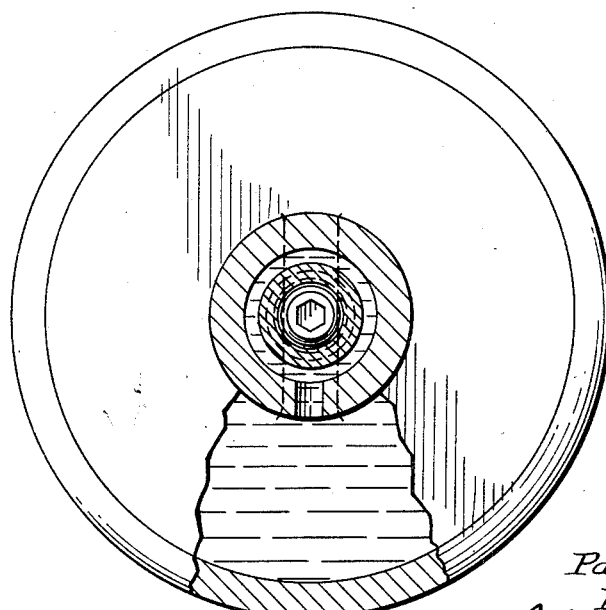
Fig. 2 is a transverse section through this spring taken on the line 2—2 of Fig. 1, looking in the direction of the arrows, and illustrating how the cylinder, in which the operating piston travels, is connected with the main reservoir of the spring.
Figure 3:
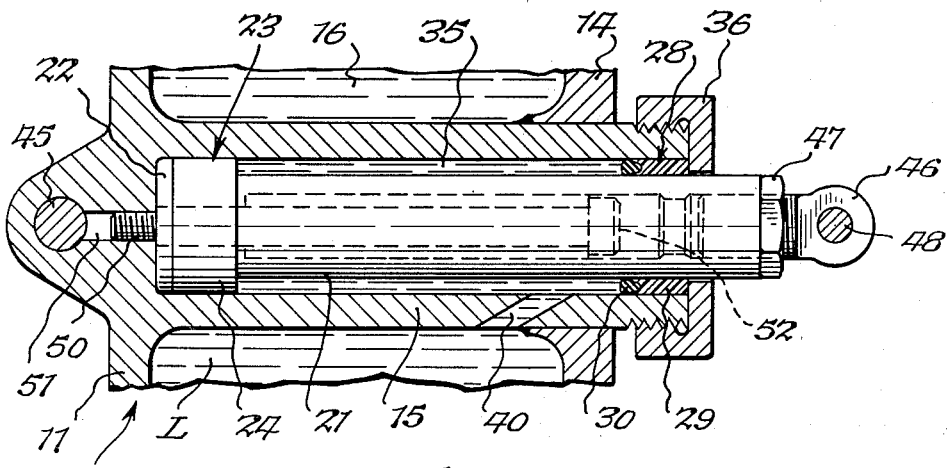
Fig. 3 is a fragmentary axial section, similar to Fig. 1, but showing the elements of the spring in their compressed or low load position.

Referring now to the drawings by numerals of reference, and first to the embodiment of the invention illustrated in Figs. 1 to 3 inclusive, 10 denotes a hollow cup-like container or receptacle having a bottom 11 and an outside cylindrical wall 12 which is integral with the bottom. The top or open end of the receptacle is closed by a plug member 14. Projecting forwardly from the bottom wall 11, and integral therewith, and extending through an opening in the plug member 14 is a cylinder 15. The cylinder 15 is disposed centrally of the receptacle or container and is concentric with the outside wall 12 of the receptacle or container. The cylinder 15 and outside wall 12 bound an annular chamber or reservoir 16 adapted to be filled with liquid L.

The particular configuration of container 10 and cylinder 15 shown is adapted to manufacture by the cold extrusion process in which both the receptacle or container and the cylinder 15 may be deep drawn. The plug member 14 may be brazed in place in tight, leak-proof engagement with the inside of the wall 12 and in leak-proof, tight engagement with the outside of the cylinder 15. The whole unit may be placed in a furnace, after assembly, and the plug member may be furnace-brazed to the receptacle 10 and cylinder 15 to close the annular chamber or reservoir 16 and form the main liquid containing portion of the spring.

Reciprocable in the cylinder 15 is a piston, denoted as a whole at 20. This piston comprises a shaft member or sleeve 21, a piston head or cap member 22, and a seal 23. The piston head or cap member 22 closes the inner end of the sleeve or shaft member 21, threading into the bore of this sleeve or shaft member. It provides a seat against which the seal 23 engages. The seal 23 is preferably of the type disclosed in the pending application of Charles Lee Rovoldt, Serial No. 298,094, filed July 10, 1952, now Patent No. 2,708,573, granted May 17, 1955. This seal comprises a nylon sleeve 24, and a rubber O-ring 25 that seats in an annular groove in the front face of seal 23.

The outer or forward end of the cylinder 15 is closed by a seal 28 similar in construction to the seal 23 and comprising a nylon sleeve 29 and an O-ring 30. The seal 28 is reversed with reference to the seal 23 and is mounted in opposed relation thereto. Seal 28 is retained in the bore 35 of the cylinder 15 by a nut 36 which threads on to the outer, protruding end of the cylinder 15.

In the compressed position of the spring, shown in Fig. 3, both the cylinder 15 and the chamber 16 are filled with a compressible liquid L such as, for instance, a liquid having a silicone base. Liquids may be provided for this purpose which have a compressibility by volume of 12% at 20,000 p. s. i. The bore 35 of the cylinder 15 is in communication with the chamber 16 through a duct or passage 40 that extends rearwardly through the wall of the cylinder 15 from bore 35 into chamber 16.

Tensioning of the spring is effected by outward movement of the piston 20 in the cylinder 15. The container or receptacle 10 may be secured to a relatively stationary part, for instance, to the flight deck of an aircraft carrier by a pin 45. A movable part, whose movement is to be resiliently restrained by the spring, such as the airplane stopping cable or wire 48 of the carrier, is connected to the piston 20 as, for instance, by means of the pin-eye 46. The shank of this pin-eye threads into the outer end of the bore of the piston shaft member or sleeve 21. The length of the spring may be adjusted by adjusting the pin-eye in the sleeve 21. A lock nut 47 is provided to secure the pin-eye in any adjusted position. A stop bolt 50, which threads adjustably at its inner end into a hole 51 in the bottom 11 of the receptacle, serves to limit outward travel of the piston 20. The shank of this bolt passes through a hole in the piston head 22; and the head 52 of this bolt is adapted to engage the outer or forward end of member 22.

Obviously, as the piston 20 moves outwardly from the position shown in Fig. 3 toward that of Fig. 1 the compressible liquid in the cylinder 15 will be forced out of that cylinder through the passage 40 into the reservoir or chamber 16, compressing the liquid in the reservoir or chamber. As the seal 23 closes off the passage 40, the outward travel of the piston is dash-potted. Finally, if the bolt 50 permits sufficient outward travel of the piston for the seal 23 to close off the passage 40, liquid will be entrapped between the seals 23 and 28; and the entrapment of this liquid together with the bolt 50 will stop the outward travel of the piston. Preferably, however, the outward travel of the piston will be stopped before the seal 23 closes off completely the passage 40. Upon release of the tension force applied to the piston 20 by the element 48 through the eye-pin 46, the resiliency of the liquid L in the chamber 16 and between the seals 23 and 28 will cause the piston to be moved to its retracted position shown in Fig. 3.

Figure 4:
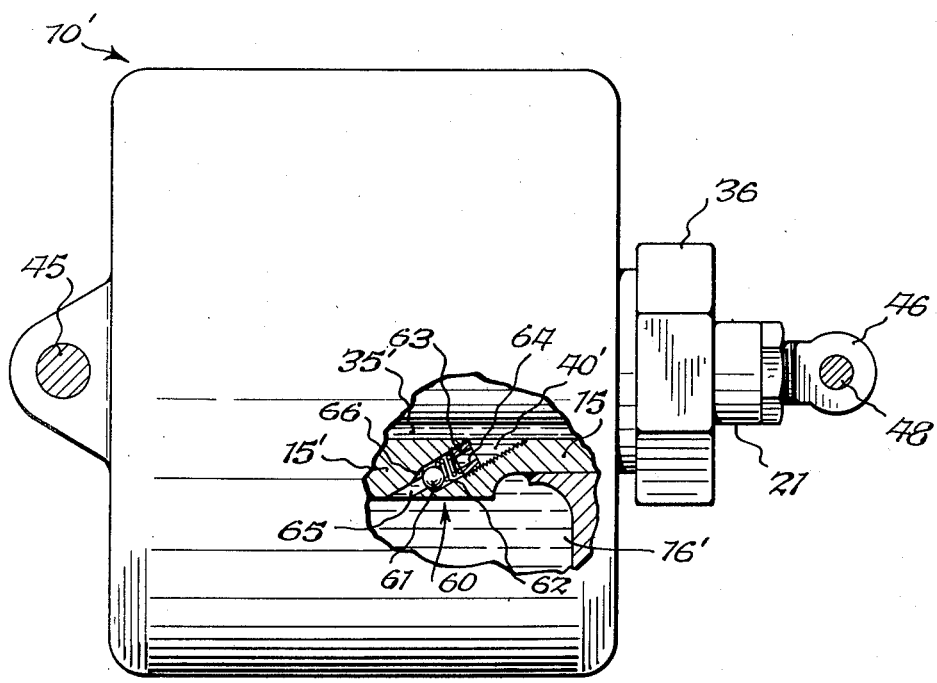
Fig. 4 is a side elevation of a spring built according to a modification of this invention, in its compressed or low load position, part of the spring being broken away to show the check valve for dampening the action of the spring in one direction.

It is sometimes desirable in a spring of this type to restrict the passage of liquid from the cylinder 15 into the reservoir 16 so as further to decelerate the travel of the spring in the tensioning direction. For this purpose, a check valve 60 may be employed as shown in Fig. 4. The check valve shown comprises a ball 61, a coil spring 62 acting against the ball, and a nut 63 for adjusting the loading of the spring. The nut has a duct 64 therethrough. The wall of the cylinder 15' is of increased thickness, as compared with the thickness of the wall of the cylinder 15 of Fig. 1, in order to provide suitable mounting for this check valve. The passage 40' between the bore 35' of the cylinder 15' and the chamber 16' of the container or receptacle 10' of Fig. 4 is reduced in diameter at its inner or rear end, as denoted at 65, so that a seat will be provided for the ball 61 in the passageway. A bleed or by-pass groove 66 is machined through the seat at one side of the passageway to allow limited passage of liquid past the check valve as the piston 20 is extended. Thus the rate of travel of the piston on its tensioning stroke is restricted while at the same time providing the resiliency which is essential to cushioning of the tensioning force. In the retracting stroke of the piston, however, the ball 61 is forced off its seat; and the liquid can pass freely from the chamber or reservoir 16' into the cylinder 15' so that the piston can be retracted at the highest possible velocity.

Obviously, reversal of the check valve will allow free flow of the liquid during tensioning of the spring, but restrict its movement during retraction. Obviously, also, by varying the size of the bleed grooves, or the number of such grooves, further control over the rate of movement of the piston in either direction can be obtained.

While the invention has been described in connection with different embodiments thereof, it will be understood that it is capable of further modification; and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described our invention what we claim is:

1. A tension liquid spring comprising a hollow, cup-shaped container closed at its bottom, a cover closing the opposite end of said container and secured to said container around its periphery against leakage of liquid from said container, a cylinder integral with said container and centrally disposed within said container and projecting forwardly from the bottom thereof outwardly through an opening in said cover, said cylinder being secured around its whole periphery to said cover and forming with said container an annular reservoir surrounding said cylinder, a piston reciprocal in said cylinder, a seal carried by said piston for sealing against leakage of liquid between said piston and said cylinder as the piston reciprocates in the cylinder, sealing means secured in said cylinder at the outer end of said cylinder and through which said piston passes for sealing against leakage of liquid from said cylinder, a duct connecting said reservoir with said cylinder and lying between the front face of said seal and said sealing means when said piston is in its inner position in said cylinder, and a compressible liquid filling said cylinder, duct, and reservoir to be compressed on outward movement of said piston, and means for limiting outward movement of said piston to prevent engagement of said seal with said sealing means.

2. A tension liquid spring comprising a hollow, cup-shaped container closed at its bottom, a cover closing the opposite end of said container and secured to said container around its periphery against leakage of liquid from said container, a cylinder integral with said container and centrally disposed within said container and projecting forwardly from the bottom thereof outwardly through an opening in said cover, said cylinder being secured around its whole periphery to said cover and forming with said container an annular reservoir surrounding said cylinder, a piston reciprocal in said cylinder, a duct connecting said reservoir with said cylinder and lying between the front face of said piston and the outer end of said cylinder when said piston is in its inner position in said cylinder, and a compressible liquid filling said cylinder, duct, and reservoir to be compressed on outward movement of said piston, means carried by said piston for sealing against leakage of liquid between said piston and cylinder as the piston reciprocates in the cylinder, and sealing means secured in said cylinder at the outer end of said cylinder and through which said piston passes and sealing against leakage of liquid from said cylinder.

3. A tension liquid spring comprising a hollow, cup-shaped container closed at its bottom and adapted to be secured to one of two relatively movable parts, a cover closing the opposite end of said container, a cylinder integral with said container and disposed centrally within said container and projecting forwardly from the bottom thereof outwardly through an opening in said cover, said cylinder being secured around its whole periphery to said cover and forming with said container an annular reservoir surrounding said cylinder, a piston reciprocal in said cylinder and adapted to be secured to the other of said two relatively movable parts, a duct connecting said reservoir with said cylinder and lying between the front face of said piston and the outer end of said cylinder when said piston is in its inner position in said cylinder, a compressible liquid filling said cylinder, duct, and reservoir to be compressed on outward movement of said piston, a check valve closing said duct against passage of liquid therethrough on outward movement of said piston, and a bleed duct for allowing restricted passage of liquid between said reservoir and said cylinder around said check valve on said outward movement of said piston.

4. A tension liquid spring comprising a container constituting a liquid reservoir, a cylinder within and integral with said container, a passage establishing communication between said reservoir and said cylinder adjacent the outer end of said cylinder, a hollow piston reciprocal in said cylinder and projecting outwardly of said cylinder, a pair of spaced seals within said cylinder and surrounding said piston, one of said seals being mounted on said piston to travel therewith to seal against leakage of liquid between said piston and said cylinder as said piston reciprocates in said cylinder, the other of said seals being stationary relative to said piston and being secured at the outer end of said cylinder to seal against leakage of liquid from said cylinder, said piston projecting outwardly through the latter seal, and a bolt secured to said container and passing through said piston and having an enlarged head at its outer end to engage and limit the outward travel of said piston to prevent contact of the seals with one another, said liquid being pressurized within said container and cylinder upon outward travel of said piston.

References Cited in the file of this patent

UNITED STATES PATENTS

| | | |
|---|---|---|
| 2,580,825 | Orloff | Jan. 1, 1952 |
| 2,604,657 | Tipper | July 29, 1952 |

FOREIGN PATENTS

| | | |
|---|---|---|
| 641,527 | Great Britain | Aug. 16, 1950 |